Aug. 4, 1931.  A. PAIS  1,817,394
HEATING DEVICE WITH HEAT ACCUMULATORS
Filed Nov. 19, 1926   2 Sheets-Sheet 1

ALEXANDER PAIS
INVENTOR
his ATTY.

Aug. 4, 1931.  A. PAIS  1,817,394
HEATING DEVICE WITH HEAT ACCUMULATORS
Filed Nov. 19, 1926  2 Sheets-Sheet 2
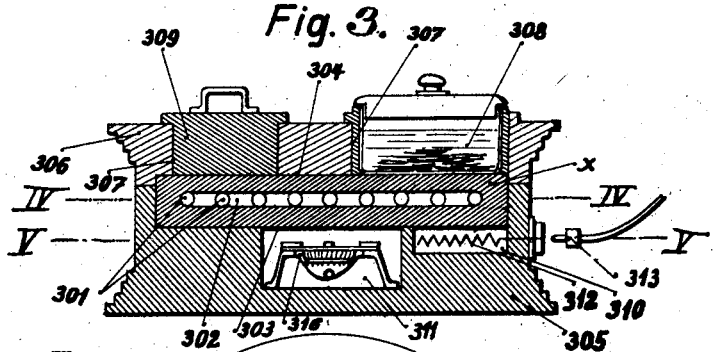
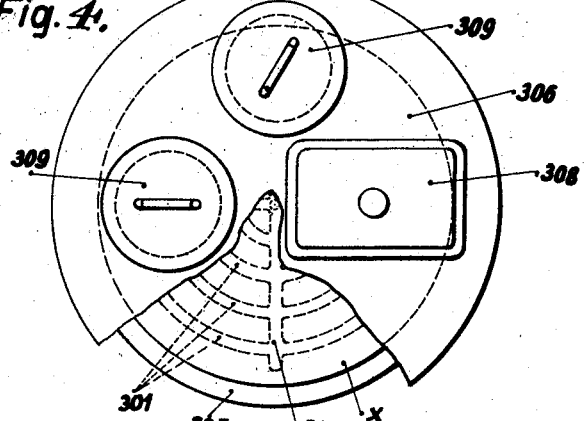
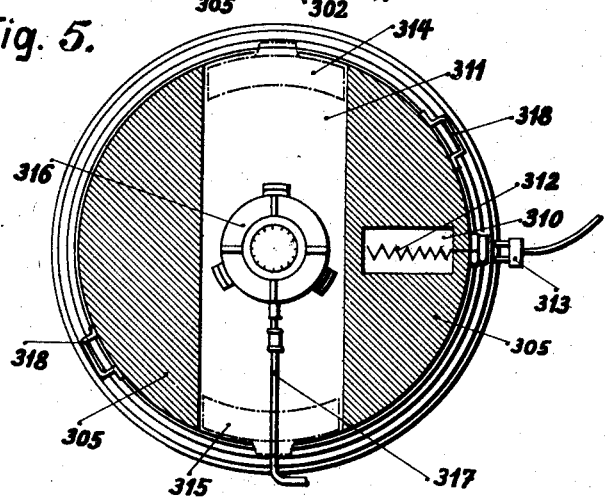
ALEXANDER PAIS
INVENTOR
By *(signature)*
his ATTY.

Patented Aug. 4, 1931

1,817,394

UNITED STATES PATENT OFFICE

ALEXANDER PAIS, OF BUCHAREST, RUMANIA

HEATING DEVICE WITH HEAT ACCUMULATORS

Application filed November 19, 1926, Serial No. 149,372, and in Austria November 19, 1925.

In order to provide economical heating arrangements of all kinds, very many different kinds of heating devices have been proposed comprising a heating body charged with a temperature equalizing medium. A known arrangement is to provide as a heating body a metal block which is heated from a source of heat and which is provided internally with a plurality of inter-connected passages charged once and for all with a temperature equalizing medium, the metal block being completely enveloped in heat insulating material, excepting at those parts of its surface which cooperate with the heat source, and at those parts of its surface which serve to deliver up heat.

By utilizing the thermal phenomena on which the said known heating devices is based heating devices for all industrial purposes and also portable heating apparatus may be provided according to the present invention which as regards heat economy and ready application under various conditions are greatly superior to any heating apparatus heretofore proposed.

Figure 1:
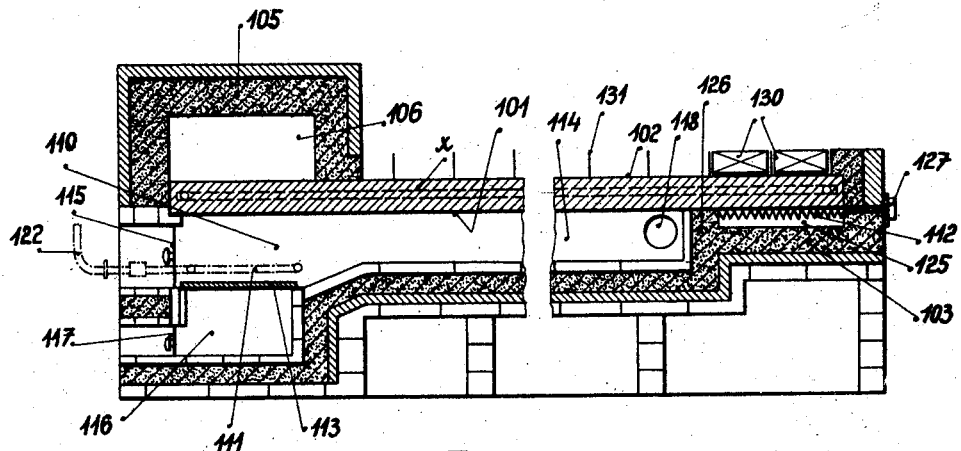
Figure 2:
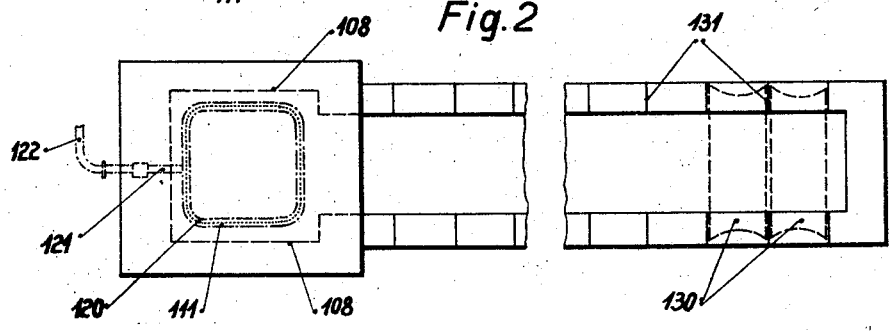

In the annexed drawings several constructional forms of heating apparatus according to the invention are illustrated by way of example. Figs. 1 and 2 show in longitudinal section and in plan view respectively a kitchen stove embodying my invention and adapted to utilize heat sources of different nature. Figures 3, 4 and 5 show by way of example, a portable heating apparatus, Figure 3 being a vertical section and Figure 4 a plan view partly in section and taken on line 4—4 of Figure 3. Figure 5 is a sectional view taken on lint 5—5 of Figure 3.

In the constructional form of my heating apparatus shown in Figs. 1 and 2 $x$ is a heat conducting block consisting for instance of a metal plate in which is provided a channel system closed fluid tight into which is filled once for ever a heat transmittting agent which is in the state of a saturated vapour within the temperature limits within which the accumulated heat is to be utilized. 101 is the heat receiving and 102 is the heat transmitting face of the block. The block $x$ is mounted in a hearth structure 103 built up of heat insulating material. Over part of the heat transmitting face 102 extends a super-structure 105 the hollow space 106 of which forms a roasting chamber. In the vicinity of the roasting chamber 106 the heat transmitting face 102 of the plate $x$ is enlarged (Fig. 2) being provided with lateral extensions 108.

On the bottom side of the block $x$ acts a plurality of heat sources operated by different heating agents. In the example shown in Figs. 1 and 2 these heat sources comprise a furnace 110 for solid fuel, a gas burner 111 and an electric heating device 112. The furnace 110 for solid fuel comprises the flue 114. 113 is the grate, 115 is the fire door, 116 is the ash pit and 117 is the ash pit door. 118 is the escape opening for the smoke at the end of the flue 114.

The gas burner 111 comprises a ring or a system of pipes provided with gas escape openings and a gas supply pipe or hose 122. The gas burner is removably arranged in the fire chamber of the furnace 110 for solid fuel and thus does not require a special chamber to mount it in. Of course the gas burner might also be permanently or removably arranged in a special compartment of the hearth 103 below the heat receiving face 101 of the block $x$. The electric heating device 112 comprises an electric resistance permanently or removably arranged in a compartment 125 below the heat receiving face 101. The compartment 125 is provided at one end of the block and is separated from the flue 114 and the fire chamber 110 by a heat insulating wall 126 of the hearth structure 103. 127 is a plug for connecting the electric heating device to a supply conductor.

On the heat transmitting face 102 of the block $x$ slide plates 130 of heat insulating material are arranged side by side. These side plates are free to slide between guide plates 131 in the hearth structure 103 and may be moved in the one or in the other direction for uncovering parts of the heat transmitting face 102 for the purpose of placing on the latter any articles to be heated such as cooking pots or for fully covering the heat transmitting face 102 when the heating apparatus is out of use.

The heating apparatus just described constitutes a large cooking stove for restaurants and the like. The block $x$ may be heated by different heat sources as may be required each of such sources by itself heating the block rapidly. Of course the block may be heated by several heat sources simultaneously. The size of the block has to be selected according to the existing conditions.

In the heating apparatus shown in Figs. 3 to 5, $x$ is a block for instance, circular in shape made of some heat conducting material which encloses a gas tight and pressure tight channel system. This channel system consists of the annular channels 301 and the radial channels 302 communicating with each other at their points of intersection.

Into the channel system is filled once forever, a heat transmitting agent which in the temperature limits within which the accumulated heat is utilized, is in the state of saturated vapor under pressure. 303 is the heat receiving and 304 is the heat transmitting face of the block $x$. The block is mounted in a base plate 305 of heat insulating material and covered by a plate 306 of the same material. The plate 306 is provided with recesses 307 extending down to the heat transmitting face 304 and serving to receive cooking vessels, for instance sterilizers 308. These recesses are closed by covers 309 of heat insulating material when the heating apparatus is out of use.

In the base plate, recesses 310, 311 are provided which extend up to the heat receiving face 303 of the block $x$ and serves to receive the heat sources. In the constructional form shown in the recess 310 an electric heating resistance 312 is mounted which may be connected to a source of electricity by means of plugs 313 and serves for heating the block $x$ electrically. The recess 311 extends diametrically through the base plate 305 and is adapted to be closed at both ends by covers 314 and 315 of heat insulating material. This recess 311 serves to receive a further source of heat in which a gas or an alcohol or a petroleum burner 316 or the like may be used. In case of a gas burner one of the covers 315 is provided with a suitable opening for the gas pipe 317 to pass through. For facilitating transport, the base plate 305 is provided with handles 318.

The heating apparatus described is compact and readily portable and as at its bottom side it is closed by heat insulating material, it may be placed on any table or other part of furniture. The block $x$ may be heated by a variety of sources of heat as may be required and each of such heat sources secures a rapid heating, but the block may also be heated by more than one source of heat at a time. The heat source 316 may also be removed from the recess 311 and utilized elsewhere when the block $x$ has been heated to a suitable temperature. The recess 311 is closed by the covers 314, 315 whereby the heat accumulated in the block is kept back therein for a long time. The apparatus is more particularly suitable for sick rooms in hospitals and the like, where frequently at night boiling water is required for sterilizing or other purposes, but it may also be used for cooking purposes in general, more particularly for cooking out of door or on the dining table itself.

Obviously instead of the previously mentioned heat sources also other heat sources of all kinds are available for heating the block, for instance, a steam heating source.

What I claim is:

1. In a heating apparatus the combination of at least one metallic block having a heat transmitting face and containing therein a system of fluid tight channels adapted to be filled once and for all with a temperature equalizing medium, heat insulating elements adapted to cover the said heat transmitting face, a heat receiving face on said block, a heat insulating structure covering the said heat receiving face of the block and divided into compartments open to the said heat receiving face and different sources of heat located in such compartments.

2. In a heating apparatus the combination of at least one metallic block having a heat transmitting face and containing therein a system of fluid tight channels adapted to be filled once and for all with a temperature equalizing medium, heat insulating elements adapted to cover the said heat transmitting face, a heat receiving face on the said block, a heat insulating structure covering the said heat receiving face of the block and divided into compartments open to the said heat receiving face, heat insulating partitions separating such compartments from each other, and different sources of heat located in such compartments.

3. In a heating apparatus the combination of at least one metallic block having a heat transmitting face and containing therein a system of fluid tight channels adapted to be filled once and for all with a temperature equalizing medium, heat insulating elements adapted to cover the said heat transmitting face, a heat receiving face on the said block, a heat insulating structure covering the said heat receiving face of the block and divided into compartments open to the said heat receiving face and different sources of heat located in such compartments, one of such sources being an electric heating device located at one end of the block.

In testimony whereof I affix my signature.

ALEXANDER PAIS.